United States Patent

[11] 3,581,613

| [72] | Inventor | Ronald Wesley Deems<br>Pittsburgh, Pa. |
|---|---|---|
| [21] | Appl. No. | 843,328 |
| [22] | Filed | July 22, 1969 |
| [45] | Patented | June 1, 1971 |
| [73] | Assignee | United Engineering and Foundry Company<br>Pittsburgh, Pa. |

[54] FLYING SHEAR CONTROL
5 Claims, 3 Drawing Figs.

[52] U.S. Cl. ................................................. 83/76
[51] Int. Cl. ................................................. B23d 5/16
[50] Field of Search ......................................... 83/76

[56] References Cited
UNITED STATES PATENTS

| 3,071,999 | 1/1963 | Thorn ......................... | 83/76 |
| 3,175,441 | 3/1965 | Drenning et al. ............ | 83/76 |
| 3,176,557 | 4/1965 | Drenning et al. ............ | 83/76 |
| 3,181,403 | 5/1965 | Sterns et al. ................ | 83/76 |
| 3,232,157 | 2/1966 | McMath et al. ............. | 83/76 |
| 3,411,388 | 11/1968 | Rappaport .................. | 83/76 |

Primary Examiner—James M. Meister
Attorney—Henry C. Westin

ABSTRACT: The disclosed flying shear control system operates on the principle of continuously positioning the shear knives as a sine curve function of the measured length of material passed through the shear in relation to the desired sheared length of material. Throughout each shearing cycle, the control system derives a prescribed shear position signal from signals representing the measured material length passed through the shear, desired sheared material length, shear knife travel distance between successive cuts, and amount of shear knife overspeed during shearing. The prescribed shear position signal is compared with an actual shear knife position to derive an error signal which is used to control the shear motor to reduce the error to zero continuously between successive cuts by the shear.

INVENTOR.
RONALD WESLEY DEEMS
BY
Henry C. Westin
ATTORNEY.

FLYING SHEAR CONTROL

This invention is addressed to a control system for a flying shear employed to sever continuously advancing material, such as a metallic billet, bar, rod, or strip delivered from a rolling mill or the like, into predetermined lengths. The control system is particularly related to establishing a synchronous speed relation between the shear knives and the material during shearing and also to shearing the material accurately into desired lengths that may be greater than or less than shear knife travel distance between cuts.

One form of flying shear control known in the art is a type known as a start-and-stop shear. The knives of such a shear are accelerated, usually at a constant rate, to a desired speed which is synchronous with or slightly greater than the speed of the material to be sheared. After shearing the material, the knives are decelerated to a rest position where they remain until a control signal initiates the next shearing cycle.

In another form of flying shear control known in the art, the shear is operated in a manner similar to the preceding shear except that the shear knives are not brought to a rest after shearing, but instead the shear knife speed is varied, either raised or lowered, to some other predetermined idle speed from which the next shearing cycle is initiated. This form of shear control has the feature of enabling a continuously operating shear to sever material into lengths less than the circumferential travel distance of the knives.

These known flying shear controls have not been altogether acceptable and necessarily involve large expenses and demands on mechanical and associated electrical equipment. This primarily occurs when it is desired to shear different sizes and lengths of material while traveling at any one of a number of different speeds. Coupled with this is required shear cycle time that must include a period when the shear knife speed is synchronous with the material speed. Moreover, these and other flying shear control systems, when operating under rolling mill environment conditions, do not produce accurate sheared material lengths. This occurs as a result of basing the control system on inaccurately assumed constants, such as material speed and shear knife acceleration and speed.

It is an object of this invention to provide a more accurate flying shear control for severing a wide range of material sizes while traveling at different speeds.

It is another object of this invention to provide an improved flying shear control based on the fundamental principle of continuously maintaining throughout each shearing cycle a prescribed position relationship between the shear knife and the length of material passed through the shear in relation to the desired sheared length.

According to the present invention, there is provided a control system for a flying shear comprising:

a power means for driving the knife of said shear through a path of travel, means for producing a first signal representing the position of the knife relative to a reference point as the knife passes through its shearing cycle, means for producing a second signal representing the correct position the knife should assume with reference to a given reference point in order to obtain the desired length cut, a control means for receiving said signals and producing an error signal representative of the difference between the said first and second signals, and means associated with said power means and responsive to said error signal for effecting a change in the position of said knife during its cycle to reduce said error signal to zero.

More particularly, the present invention provides a control system according to the immediately preceding control system wherein the said control circuit produces the said prescribed shear knife position control signal according to the following expression:

$e = \theta - \theta'$ where $e$ = error signal to motor, $$\theta = \left[\frac{m}{L} - \frac{L}{2\pi}\left(\frac{1}{L} - \frac{1+O.S.}{L_K}\right)\sin\frac{2\pi m}{L}\right]$$
= desired shear position $\theta'$ = actual shear position, $m$ = continuously measured length of material passed through the shear, $L$ = desired sheared length of material, $O.S.$ = amount of overspeed of the shear knives relative to material speed during cut, and $L_K$ = circumferential shear knife travel distance.

These features and advantages, as well as others, will become more apparent when the following description is read in light of the accompanying drawings of which:

Figure 1:
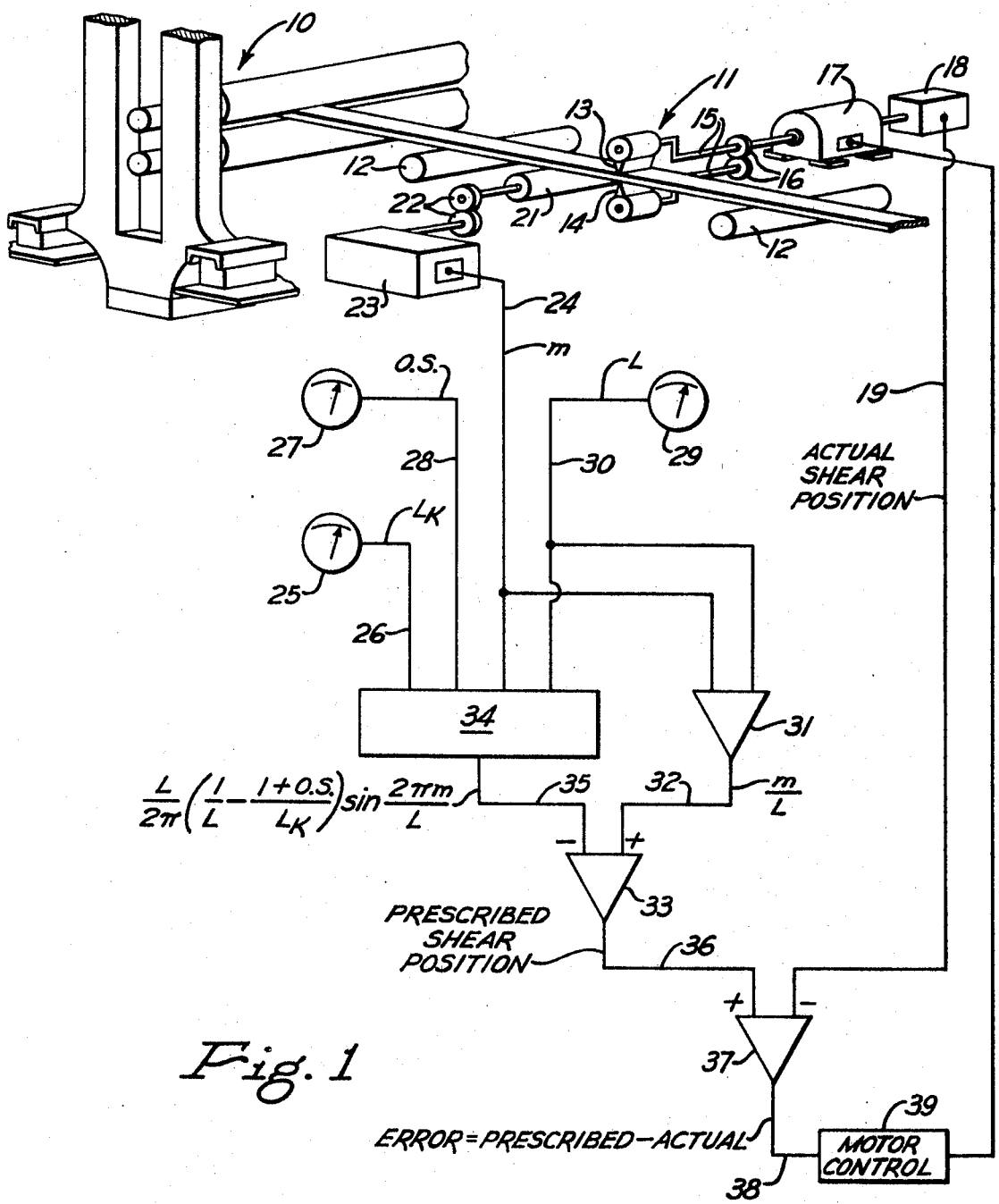
FIG. 1 is a perspective view of a flying shear and rolling mill incorporating the flying shear control system according to the present invention.

FIG. 1 illustrates the preferred embodiment of the present invention wherein there is provided a rolling mill 10 from which workpieces are discharged in the direction indicated by the arrow to a flying shear 11. The shear is constructed and arranged to sever the workpiece while traveling at any one of a number of different speeds into a plurality of shorter lengths for further handling and processing. A roller table having a plurality of driven rollers 12 is used to convey the workpiece before and after shearing.

The shear essentially comprises upper and lower knives 13 and 14, respectively, carried in suitable holders by eccentric portions of shafts 15 which are interconnected by gears 16. A variable speed motor 17 is connected to one of the shafts 15 whereby the shear knives are displaced through a circumferential travel distance into and out of a workpiece severing relation. A pulse generator 18 is driven by the motor 17 and produces a large and predetermined number of pulses for each revolution of the motor; hence, the circumferential travel distance of the shear knives. This is to be defined as a shearing cycle. Thus, the relative angular position of the shear knives with respect to a selected reference point is determinable at any instance by the relation that a counted number of pulses has to the total number of pulses for a shearing cycle. The line 19 connected to the pulse generator 18 carries a continuous signal representative of the actual relative angular position of the shear knives.

Between the rolling mill 10 and the flying shear 11 there is located a measuring roll 21 connected by a gear train 22 to a pulse generator 23. The pulse generator 23 is employed, according to the present invention, to provide a signal $m$ over the line 24 representing the length of workpiece passing through the shear during each shearing cycle.

The signal $m$ and "shear position" form part of a shear control system which also includes a signal "$L_K$" generated by a potentiometer 25 for transmission over a line 26 and represents the circumferential distance traveled by a shear knife during each shearing cycle. A potentiometer 27 provides a signal "O.S." transmitted over line 28 and represents a small desired amount of shear knife overspeed with respect to the speed of the workpiece during the actual period of shearing. A potentiometer 29 generates a signal "L" over a line 30 to represent the desired sheared length of workpiece. The signals "$L_K$," "O.S.," $m$, and "L" are used in a control circuit to produce a continuous prescribed shear position signal derived according to the expression $$\frac{m}{L} - \frac{L}{2\pi}\left(\frac{1}{L} - \frac{1+O.S.}{L_K}\right)\sin\frac{2\pi m}{L} \quad (1)$$

The control circuit essentially comprises an amplifier 31 receiving signals $m$ and "L" from lines 24 and 30, respectively, and produces a signal $M/L$ in a line 32 which is connected to an amplifier 33. The signals "$L_K$," "O.S.," $m$ and "L" are combined in a control box 34 having circuitry, shown in FIG. 2 and described hereinafter, to produce a signal according to the expression $$\frac{L}{2\pi}\left(\frac{1}{L}-\frac{1+O.S.}{L_K}\right)\sin\frac{2\pi m}{L} \qquad (2)$$

The signal, according to equation (2), is transmitted by line 35 to the amplifier 33 where it is combined according to equation (1) with the signal in line 32 to form the prescribed shear position signal which is transmitted by line 36 to an amplifier 37. The amplifier 37 also receives the actual relative angular shear position signal from line 19 and forms a shear position error signal which is transmitted by a line 38 to a motor control 39 for controlling the speed of the shear motor 17 according to the error signal.

Figure 2:
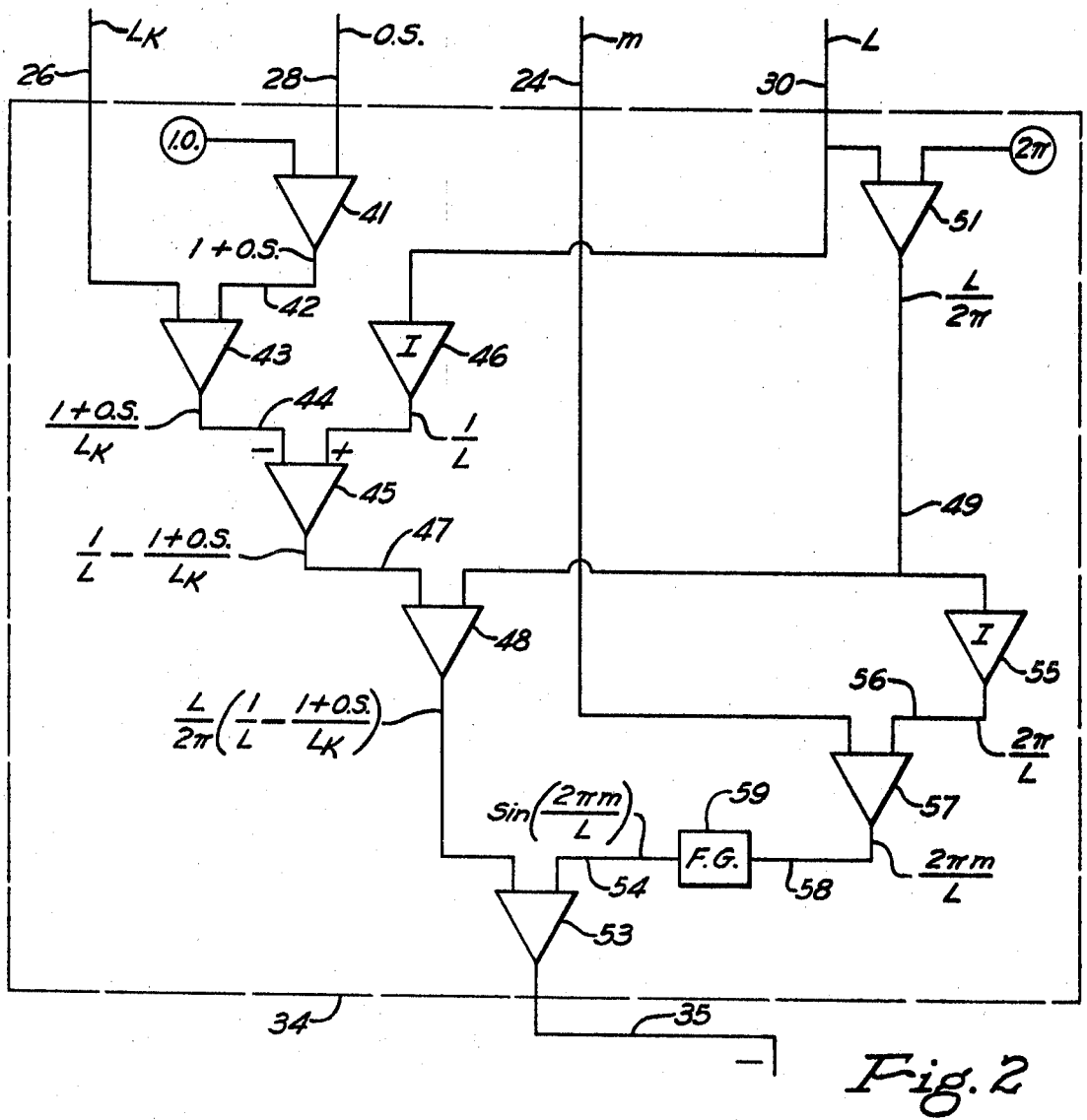
FIG. 2 is a detailed view of a component part of the control system illustrated in FIG. 1.

With reference now to FIG. 2, there is illustrated the principal component and circuit making up the control for the box 34 to produce the signal according to equation (2). In this circuit, the signal O.S. is added to a constant, valued at 1, by an amplifier 41 to produce a signal 1+O.S. transmitted by line 42 to an amplifier 43 which also receives a signal representing $L_K$. The amplifier 43 produces a signal in line 44 representing 1+O.S./B&K which is transmitted to an amplifier 45 where it added to a signal representing 1/L produced from the signal L by an inverting amplifier 46. The signal from the amplifier 45 representing $$\frac{1}{L}-\frac{1+O.S.}{L_K}$$

is sent by line 47 to an amplifier 48 where it is multiplied by a signal representing $L/2\pi$ transmitted by line 49. The latter signal is derived from the signal L divided by the constant $2\pi$ in an amplifier 51.

Referring again to the amplifier 48, the transmitted signal $$\frac{L}{2\pi}\left(\frac{1}{L}-\frac{1+O.S.}{L_K}\right)$$

is received by a multiplying amplifier 53 where it is combined with a signal from line 54 representing the $\sin 2\pi m/L$ and thus producing the signal according to equation (2). The signal transmitted by line 54 is derived by inverting the signal from line 49 in an amplifier 55 to represent $2\pi/L$. This signal is transmitted by line 56 to an amplifier 57 where it is multiplied with the signal $m$. The output from amplifier 57 is sent by a line 58 to a sine function generator 59 to produce the desired signal in line 54, i.e., $\sin 2\pi m/L$.

It will be appreciated by those skilled in the art that mathematical expressions other than equation (1) may be used to develop a control circuit without departing from the spirit of the present invention. For example, it is contemplated that the mathematical expression may be derived based upon trigonometry functions other than the sine, such as an hyperbola and an ellipse.

Figure 3:
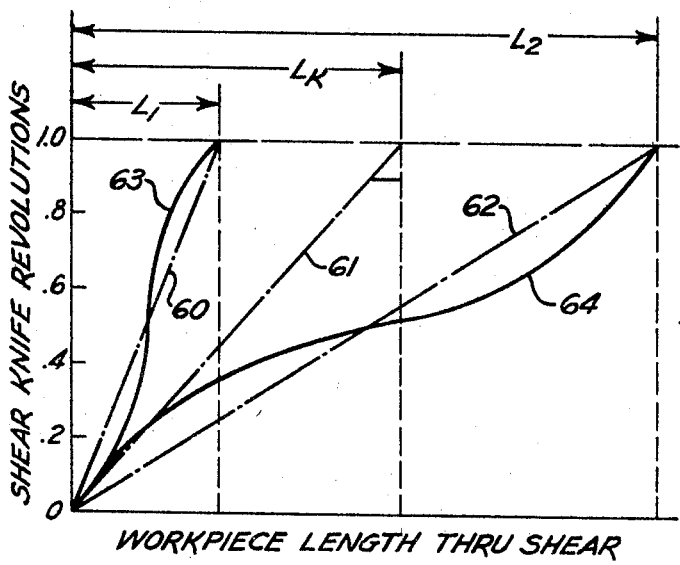
FIG. 3 is a graph illustrating shear knife position vs. sheared material length.

The graph illustrated in FIG. 3 particularly shows the prescribed position relationship between the shear knives and the desired sheared length of material. This graph is particularly useful for acquiring an understanding of the underlying principle of the present invention.

In the graph, the notations "L," "$L_K$," and "$L_2$" represent sheared length of workpieces that are less than equal to and greater than the circumferential travel distance of the shear knives. Lines 60, 61 and 62 represent the position of the workpieces through the shear in relation to the position of the shear knives. The sinelike curves 63 and 64 represent the position of the shear knives in relation to the length of workpieces passed through the shear. Thus, it is apparent that throughout each shearing signal there is a prescribed relationship between the length of workpieces through the shear and the position of the shear knives. It is important to note that with respect to the graph lines 60—63 and 62—64, the shear knives and material assume a positioned relationship which is nearly equal with the shear knives traveling a slightly greater distance with respect to material travel. During this period, actual shearing of the material takes place. Since the positioning of the shear knives relative to the material is nearly equal, the desired synchronous relation is thus established.

With respect to the line 61, since the length of material to be sheared is equal to the travel distance of the shear knives, the relationship therebetween is one to one and, therefore, the shear knives track the position of the material through the shear. In this instance, the sine function produces a shear knife position curve with zero amplitude.

In accordance with the provisions of the patent statutes, I have explained the principle and operation of my invention and have illustrated and described what I consider to represent the best embodiment thereof.

I claim:

1. A control system for continuously positioning the knife of a flying shear comprising:

motor means operatively connected to a movable knife of said flying shear to cause the knife to sever material into predetermined lengths, a first signaling means producing a signal representing the position of the shear knife during its movement through the shearing cycle relative to a reference point, a second signaling means producing a signal representing a continuous length measurement of the material passing a given point relative to a point where the knife severs the material, a control circuit receiving the signal from the second signaling means and producing the desired shear knife position control signal, the control circuit including means for deriving an error signal by continuously comparing the actual shear knife position as produced by said first signaling means with the desired shear position as defined by a continuous cyclic mathematical function which includes both the desired cut length and the instantaneous and continuous measurement of the material as produced by said second signaling means, and control means connected to the motor means and continuously receiving said error signal to effect a change in the position of said knife during the shearing cycle to continuously maintain the error signal at zero.

2. In a control system for continuously positioning the knife of a flying shear according to claim 1 wherein the control circuit upon receiving said signals derives the error signal by the following formula:

$e=\theta-\theta'$ where $e$ = error signal to motor, $$\theta=\left[\frac{m}{L}-\frac{L}{2\pi}\left(\frac{1}{L}-\frac{1+O.S.}{L_K}\right)\sin\frac{2\pi m}{L}\right]$$

= desired shear position $\theta'$ = actual shear position, $m$ = continuously measured length of material passed through the shear, $L$ = desired sheared length of material, $O.S.$ = amount of overspeed of the shear knives relative to material speed during cut, and $L_K$ = circumferential shear knife travel distance.

3. A control system for continuously positioning the knife of a flying shear according to claim 1 wherein said control circuit further includes means for producing said function as a single continuous cyclic trigonometrical function or two or more continuous noncyclic trigonometrical functions.

4. In a control system for continuously positioning the knife of a flying shear according to claim 3 wherein said control circuit includes means for characterizing said function as a trigonometrical sine function.

5. A control system for continuously positioning the knife of a flying shear according to claim 1 wherein said control circuit includes means representing the overspeed of the shear knife with respect to the material at the instant of shearing.